Dec. 15, 1953          H. L. KEITH          2,663,000
DUAL VOLTAGE SWITCHING DEVICE

Filed Jan. 2, 1952          2 Sheets-Sheet 1

Hubert Lee Keith
INVENTOR.

BY *Clarence A. O'Brien*
*and Harvey B. Jackson*
Attorneys

Dec. 15, 1953   H. L. KEITH   2,663,000
DUAL VOLTAGE SWITCHING DEVICE
Filed Jan. 2, 1952   2 Sheets-Sheet 2
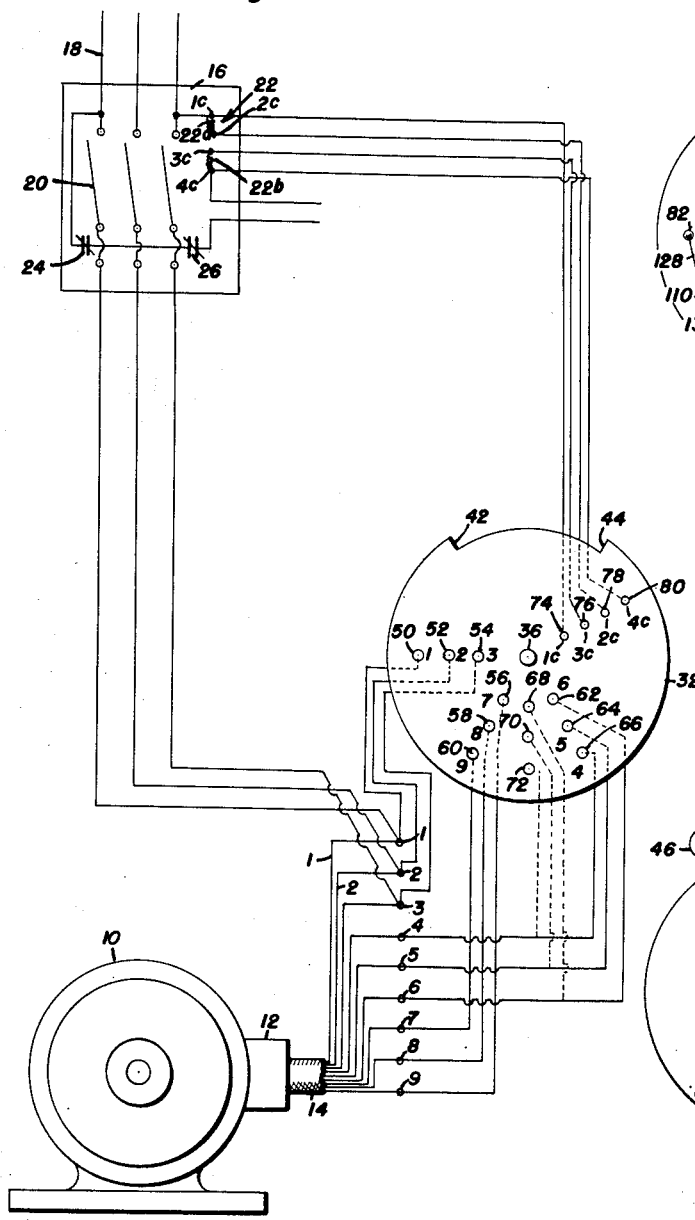
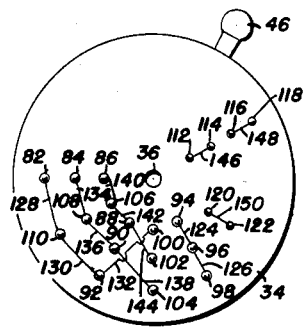
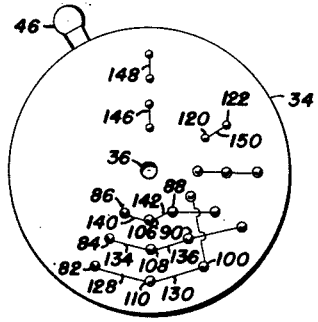
Hubert Lee Keith
INVENTOR.

Patented Dec. 15, 1953

2,663,000

UNITED STATES PATENT OFFICE 2,663,000

DUAL VOLTAGE SWITCHING DEVICE

Hubert Lee Keith, Mishawaka, Ind.

Application January 2, 1952, Serial No. 264,475

2 Claims. (Cl. 318—440)

This invention relates to a dual voltage switching device and particularly to a switching device to be attached to the leads of a standard two-voltage, three-phase motor for selecting the connections of the motor to operate at either of the two normal voltages.

Most portable electric motor-driven machinery such as contractor's hoists, air compressors, pumps, etc. use three-phase alternating current motors as the power plant for the devices. Because of the arrangement of the electrical distribution systems it is found that at some locations 220 volt, three-phase power is available and at others 440 volt, three-phase power is available.

For this reason, and for many others, standard motors of the three-phase type have been constructed to operate on either 220 or 440 volts, the so-called standard dual voltage motors. The National Electric Manufacturer's Association has standardized such connections so that all makers of such dual voltage motors have identical terminal facilities. The various end terminals of the windings are brought out to a terminal box and the terminals are provided with standard numbers according to the N. E. M. A. standards. When it is desired to use one of these dual voltage motors at any one of the described voltages it is necessary to remove the cover plate from the motor and to connect the terminals according to the standard N. E. M. A. diagram. Such connection requires skilled labor to make the proper connection and to properly tape and insulate the same so that it will operate over long periods of time or under all stresses that the motor may be subject to without short circuiting or otherwise disturbing the motor.

The standard dual voltage motors of the three-phase type may be either Y-connected or so-called star connected or they may be delta connected or so-called polygon connection. In either event, the motor windings will be built in a plurality of sections, usually two, with the terminals brought out and labeled as per the N. E. M. A. specifications. Any skilled electrician knowing the N. E. M. A. diagrams may safely connect the proper terminals together it being necessary only to know whether the motor is Y or delta connected. Dual voltage motors usually come with wiring diagram plates attached, showing the proper grouping of the terminals for the voltage desired.

It is also customary to use a line switch or a main line breaker with such a motor and to provide the breaker or line switch with a dual voltage holding coil. That is, the holding coil is divided into two sections and may be connected either in parallel or in series depending on the voltage to be handled.

The present invention provides a switch arrangement to be permanently connected to the nine terminals of such a standard dual voltage motor and to the four terminals of such a standard dual voltage line switch and provide connections so that a simple single movement of the switching device will connect either for the low voltage or the high voltage use.

The switch device is likewise provided with an auxiliary set of terminals so that the same motions can be utilized with either a delta or a Y-connected machine with the only difference being that three of the terminals are connected to different sets of terminals in the switching device for the Y and delta machines.

The switching device according to this invention comprises a switch base having a plurality of terminals arranged in a predetermined pattern thereon for connection to the terminals of the split windings of the motor and the split coil windings of the line switch. A switch plate cooperating with the switch base has terminals which are connected together so that the plate may be selectively positioned with respect to the base to connect together certain terminals in the base so that the windings in the motor and in the line switch may be connected in either the parallel or series relation as is desirable because of the voltage at which the motor is to be operated.

It is accordingly an object of this invention to provide an improved dual voltage switching device.

It is a further object of this invention to provide a switching device capable of a single motion of connecting the split windings of a standard dual voltage motor in either of the voltage positions.

It is a further object of this invention to provide a dual voltage switch which may be connected to either a delta or a Y-connected motor.

It is a further object of this invention to provide a dual voltage arrangement in which the voltage may be changed without the necessity of opening the motor terminal box and making any arrangement therein.

It is another object of the invention to provide a two-position switch for connecting a dual voltage motor in either of its dual voltages.

Further objects and many of the attendant advantages of this invention will be apparent from the following detailed description taken in conjunction with the accompanying drawings in which:

Figure 5 is a diagrammatic view of a standard dual voltage motor and switch with the changeover dual voltage switching device connected thereto;

Figure 6 is a top plan view of the switch plate in the standard low voltage position, with the contacts and connectors thereto shown as if the top of the switch were transparent;

Figure 7 is a view similar to Figure 6 showing the switch located in high voltage position with the same transparent effect;

Figure 1:
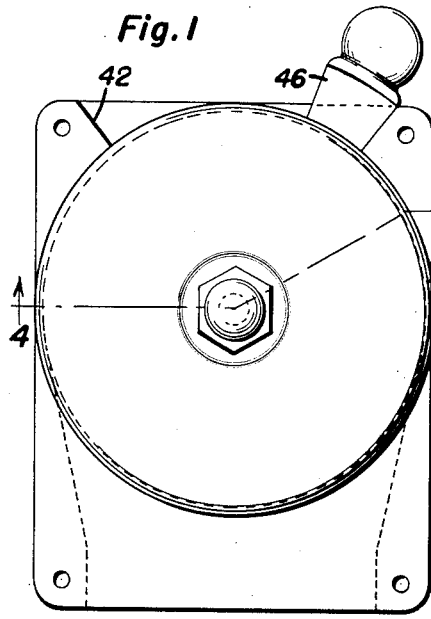
Figure 1 is a top plan view of a dual voltage switch according to the invention.
Figure 3:
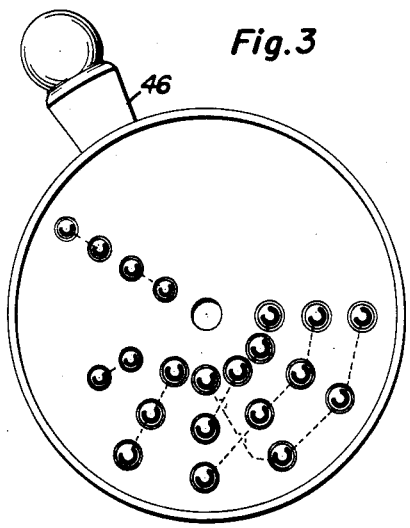
Figure 3 is a bottom plan view of the switch plate showing the arrangements of the contacts therein and the arrangement of the connections between certain of the contacts.
Figure 2:
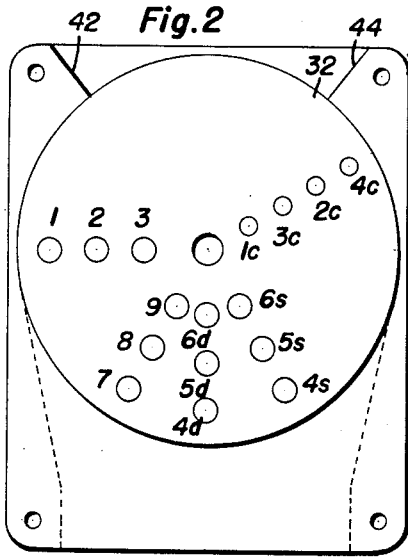
Figure 2 is a top plan view of the base of the dual voltage switch showing the pattern of the arranged terminal contacts therein.
Figure 4:
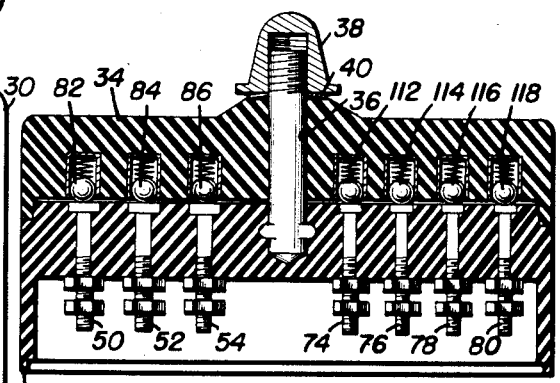
Figure 4 is a vertical section through the control switch and taken along the line 4—4 of Figure 1.
Figure 8:
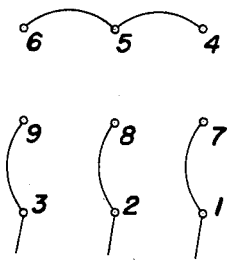
Figure 9:
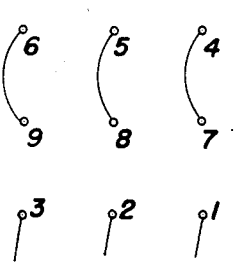
Figures 10, 11:
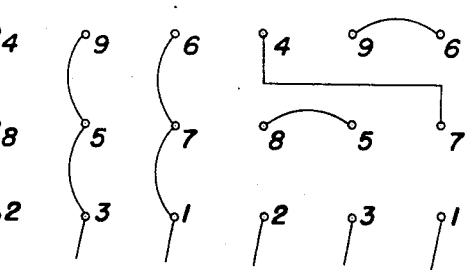

Figure 8 is a standard N. E. M. A. connection diagram for connecting a standard dual voltage Y connected motor in low voltage or parallel arrangement;

Figure 9 is a similar N. E. M. A. diagram of a Y-connected motor with the terminals connected in high voltage or series arrangement;

Figure 10 is a standard N. E. M. A. wiring diagram for a delta connected motor showing the terminals connected in low voltage or parallel arrangement; and, Figure 11 is a similar standard N. E. M. A. connecting diagram showing the terminals of a delta connected dual voltage motor connected in high voltage or series arrangement.

In the exemplary embodiment of the invention, a standard dual voltage motor 10 is provided with a terminal box 12 in which are brought out the standard nine terminals of a standard dual voltage motor. The standard terminals 14 are numbered 1 to 9 according to the standard N. E. M. A. specification. A standard circuit breaker or line switch 16 is connected in the supply line 18 supplying three-phase power at either 220 or 440 volts to the standard dual voltage motor 10. The breaker 16 is provided with a plurality of contact blades 20 for closing the phases of the line 18. A dual voltage closing coil 22 is provided with two sections 22a and 22b, the standard terminals of the coil 22 being numbered 1c and 2c for one section of the coil and 3c and 4c for the other section of the coil, the coil normally being energized by means of a starter switch not shown through the normally closed contacts 24 and 26 of the breaker 16. All of this arrangement is standard practice and is in no wise part of this invention.

Instead of providing connections within the terminal box 12 each time the motor is to be utilized for a different voltage the present invention provides a switching device 30 which includes a base 32 which is preferably provided with an annular base plate although obviously it can be of any size and shape. A switch plate 34 is pivotally mounted on a stud 36 which is anchored in the base 32. A nut or fastener 38 is applied to the stud 36 and a spring 40 is applied between the nut and the cover 34 for maintaining the cover 34 in firm contact with the base 32. The base is provided with shoulders 42 and 44 to receive a handle 46 which is rigidly secured to the cover plate 34 and limits its oscillatory motion about the stud 36 so that the switch may assume either of two positions with the handle 46 against either the shoulder 42 or the shoulder 44.

The switch base 32 is provided with a plurality of contacts for connection to the terminals 1 to 9 and for convenience in following the connection the small numerals 1 to 9 have been applied to these contacts as well as the reference numerals 50 to 72. The reference numerals 50, 52 and 54 relate to the contacts connected to the motor terminals 1, 2 and 3 which are the line or outside terminals of the split windings. The terminals 56, 58 and 60 are connected to the terminals 7, 8 and 9 of the motor windings which represent the outside of the second split winding. The contacts 62, 64 and 66 are connected to the terminals 4, 5 and 6 of the motor 10 when the motor 10 is of the Y or star connected type. The switch plate 32 is likewise provided with alternate terminals 68, 70 and 72 to which the terminals 4, 5 and 6 are connected when the motor 10 is of the delta connected type.

The base 32 is likewise provided with four terminals 74, 76, 78 and 80 to which the terminals 1c, 3c, 2c and 4c of the split coil 22 are connected. For purposes of convenience in following the connections the designations 1c to 4c have likewise been applied to the terminals 74 to 80.

While obviously the contacts 50 to 80 could be placed in any number of patterns a convenient and preferable pattern places each of the groups of terminals in a straight line and since this is a rotary selector, as shown, the straight lines are made radial with respect to the pivot point 36. The outside terminals 50 to 54 are arranged in a single line while the terminals 56 to 60 are likewise arranged in a separate straight line and the terminals 62 to 66 in still another straight line while the auxiliary terminals are arranged in an auxiliary straight line. The terminals 74 to 80 of the holding or actuating coil 22 are likewise arranged in a straight line but separated from the contacts 50 to 72 for reasons which will be obvious.

A cover plate 34 is likewise provided with a plurality of contacts 86 to 122. The contacts 82, 84 and 86 are arranged in a straight line group which is radial with the pivot point 36 and the contacts 88, 90 and 92 are likewise a straight line radial group. The contacts 94, 96 and 98 provide still another straight line group while the contacts 100, 102 and 104 form a straight line group between the groups 88 to 92 and 94 to 98 while an auxiliary group 106 to 110 is placed intermediate between the groups 82 to 86 and 88 to 92.

The contacts 112 to 118 are arranged in a straight line group and contacts 120 and 122 are likewise arranged in an auxiliary straight line group.

The terminals may be arranged in a rectangular sliding selector instead of a rotary selector, as shown. The straight line groups would then be arranged in parallel lines instead of radial lines.

To provide low voltage operation or parallel connection of the split windings of the motor 10 the terminals 94, 96 and 98 are connected together by means of suitable connectors 124 and 126. The terminals 82 and 110, 92 and 100 are likewise connected into a single group by means of connectors 128, 130, and 132. Likewise terminals 84, 108, 90 and 104 are connected together into a single group by means of connectors 134, 136, and 138. Also terminals 86, 106, 88 and 102 are connected into a group by means of connectors 140, 142, and 144. The coil terminals of coil 22 are connected together as follows by means of the connector 146 extending between contact 112 and 114 and connector 148 extending between terminals 116 and 118. Also terminals 120 and 122 are connected together by connector 150. In the operation of the device the switching mechanism is moved to the position shown in Figure 6 to operate the motor on 220 volts or the low voltage group. Assuming that the motor is star connected, the neutral point of the outer section of the split winding will be established by means of the connector 124 and 126 which connects together the contacts 94, 96 and 98 which make connection or in contact with contacts 62, 64 and 66 which are connected to the terminals 4, 5 and 6 of the motor winding. Likewise the contact 50 which is connected to the terminal 1 is in engagement with the contact 82 and is connected by means of connectors 128 and 130 to the contact 92 which is in engagement with the contact 60 which is connected to the terminal 7 of the motor so that the terminals 1 and 7 are connected together. The terminal 2 of the motor is connected to contact 52 which is in engagement with contact 84 which is connected to contact 90 by means of connectors 134 and 136; the contact 90 is in engagement with contact 58 which is connected to terminal 8 of the motor so that terminals 2 and 8 are connected together. Likewise, the terminal 3 of the motor is connected to contact 54 which is in engagement with the contact 86 which is connected to the contact 88 by means of the connectors 140 and 142, the contact 88 is in engagement with contact 56 which is connected to terminal 9 of the motor so that terminals 3 and 9 are connected together. It will thus be seen that this switch arrangement when in position as shown in Figure 6 will connect together terminals 4, 5 and 6, terminals 1 and 7, terminals 2 and 8, and terminals 3 and 9 as required by the N. E. M. A. chart as shown in Figure 8.

In a similar manner, the terminals 1c to 4c of the coil 22 will be connected together as follows: Terminal 1c is connected to contact 74 which is in engagement with contact 112 which is connected to contact 114 which is in engagement with contact 76 which is connected to terminal 3c which is connected to the terminal 3c of the coil 22 so that terminals 1c and 3c are connected together by the connector 146. Likewise the terminal 2c is connected to the contact 78 which is in engagement with the contact 116 which is connected to contact 118 by means of connector 148 with contact 118 being in engagement with contact 78 which is connected to terminal 4c of the coil 22 so that coil terminals 2c and 4c are connected together and the coil sections 22a and 22b are connected in parallel for low voltage operation.

To operate the dual voltage motor 10 on the high voltage of 440 volts the switch apparatus is thrown to the position shown in Figure 7 where the terminal 4 of the motor is connected to the contact 66 of the plate 32 with the contact 66 being in engagement with contact 100 of the switch plate 34 and being connected to the contact 82 by means of the connectors 130 and 128 with contact 82 being in engagement with contact 60 which is connected to terminal 7 of the motor so that terminals 4 and 7 are connected together. Also, the terminal 5 is connected to contact 64 which is in engagement with contact 98 and is connected to contact 84 by means of connectors 136 and 134 while the contact 84 is in engagement with contact 58 which is connected to terminal 8 of the motor so that terminals 5 and 8 are connected together. Likewise, terminal 6 is connected to contact 62 which is in engagement with contact 88 and is connected to contact 86 by means of connectors 142 and 140, the contact 86 being in engagement with contact 56 which is connected to terminal 9 of the motor so that terminals 6 and 9 are connected together. It will thus be seen that the switch shown in the position shown in Figure 7, terminals 4 and 7 are connected together, terminals 5 and 8 are connected together, and terminals 6 and 9 are connected together as per the N. E. M. A. chart as seen in Figure 9.

When the motor 10 is delta connected the terminals 4, 5 and 6 will be disconnected from the terminals 62, 64 and 66 and connected as shown in dotted lines to the auxiliary terminals 68, 70 and 72.

In the operation of the device as a delta connected low voltage motor, the switch will be thrown to the right as shown in Figure 6 and terminals 1, 7 and 6 will be connected to the contacts 50, 60 and 68 which are in engagement with contacts 82, 92 and 100 which are connected together by means of connectors 132, 130 and 128 so that terminals 1, 6 and 7 are connected together. Also, terminals 3, 5 and 9 are connected to terminals 54, 56 and 70 which are in engagement with the contacts 86, 88 and 102 which are connected together by connectors 144, 142 and 140 so that terminals 3, 5 and 9 are connected together. Likewise, terminals 2, 8 and 4 are connected to contacts 52, 58 and 72 which are in engagement with contacts 84, 90 and 104 which are connected together by connectors 138, 136 and 134 so that terminals 2, 8 and 4 are connected together. It will thus be seen that terminals 1, 7, 6, terminals 2, 5 and 9 and terminals 2, 8 and 4 are connected together as required by the N. E. M. A. chart as shown in Figure 10.

For high voltage operation of the delta connected motor the handle 46 is turned to the left as shown in Figure 7 and it will be seen that terminal 4 is connected to contact 72 which is in engagement with contact 110 which is connected by means of connector 128 to contact 82 and is in engagement with contact 60 which is connected to terminal 7 so that terminals 4 and 7 are connected together. Also, terminal 5 is connected to contact 70 which is in engagement with contact 108 which is connected by means of connector 134 to contact 84 which is in engagement with contact 58 which is connected to terminal 8 of the motor so that terminals 5 and 8 are connected together. Likewise, terminal 6 is connected to contact 68 which is in engagement with contact 106 which is in contact by means of connector 140 with contact 86 which is in engagement with contact 56 which is connected to terminal 9 of the motor so that terminals 6 and 9 are connected together. It will thus be seen that terminals 4 and 7, terminals 5 and 8 and terminals 6 and 9 are connected together as per the chart according to N. E. M. A. standards as shown in Figure 11.

It will thus be seen that the switching device according to the present invention provides an arrangement by which a motor either delta or Y-connected may be operated at either high or low voltage by a simple changeover movement of the switch. Also, once the switch has been connected for the predetermined type of motor it will be unnecessary to ever open the terminal box and the switch may be mounted solidly thereon and be actuated as a part of the motor. The invention thus provides a simple, compact and easily operated device which may be operated without the use of skilled labor and save much time and expense in the connection of motors for operation at dual voltages.

For purposes of exemplification, a particular embodiment of the invention has been shown and described according to the best present understanding thereof, however, it will be apparent to those skilled in the art, that many changes and modifications can be made therein without departing from the true spirit of the invention.

Having thus described the invention, what is claimed as new is:

1. For use in a three phase motor of the type wherein each of the phases has a first and second coil with each of the coils having an inner and an outer end, the outer ends of said first coils being connected to the conductors of a supply line, the inner ends of said second coils being connected to determine the mode of operation of the motor, a voltage selector comprising an insulating base plate, first, second and third group of contacts mounted in said base plate, the contacts of each group being arranged in a line, said groups being equally spaced, the outer ends of said first coils being connected to said first group of contacts, the outer ends of said inner coils being connected to said second group of contacts, a fourth group of contacts, said fourth groups of contacts being arranged intermediate said second and third group of contacts, the inner ends of said first coils being selectively connected to said third or fourth group of contacts, a switch plate slidably mounted on said base plate, means limiting motion of said switch plate with respect to said base plate, said switch plate being movable a distance equal to the distance between said first and second groups of contacts in said base plate, five groups of switch contacts in said first plate, said groups of switch contacts being spaced apart one-half the distance between the first and second groups of contacts in said base, connectors connecting the respective contacts of the first, second and third switch contacts together, connectors connecting the fourth group of switch contacts in advanced progression with respect to the contacts of the third group of switch contacts, conductors connecting the fifth group of switch contacts in short circuited relation.

2. For use in a three phase motor of the type wherein each of the phases has a first and second coil with each of the coils having an inner and an outer end, the outer ends of said first coils being connected to the conductors of a supply line, the inner ends of said second coils being connected to determine the mode of operation of the motor, a voltage selector comprising an insulating base plate, first, second and third groups of contacts mounted in said base plate, the contacts of each group being arranged in a line, said groups being equally spaced, the outer ends of said first coils being connected to said first group of contacts, the outer ends of said inner coils being connected to said second group of contacts, a fourth group of contacts, said fourth groups of contacts being arranged intermediate said second and third group of contacts, the inner ends of said first coils being selectively connected to said third or fourth group of contacts, a switch plate slidably mounted on said base plate, means limiting the motion of said switch plate with respect to said base plate, said switch plate being movable a distance equal to the distance between said first and second groups of contacts in said base plate, five groups of switch contacts in said switch plate, said groups of switch contacts being spaced apart one-half the distance between the first and second groups of contacts in said base, connectors connecting the respective contacts of the first, second and third switch contacts together, connectors connecting the fourth group of switch contacts in advanced progression with respect to the contacts of the third group of switch contacts, conductors connecting the fifth group of switch contacts in short circuited relation, a line switch for said motor, first and second magnet coils in said line switch, a group of magnet coil contacts in said base plate, two groups of magnet switch contacts in said switch plate, said groups of magnet switch contacts selectively connecting said magnet coils in series or in parallel.

HUBERT LEE KEITH.

References Cited in the file of this patent

UNITED STATES PATENTS

| Number | Name | Date |
|---|---|---|
| 682,729 | Metz | Sept. 17, 1901 |
| 1,094,534 | Conrad | Apr. 28, 1914 |
| 1,123,321 | Lamme | Jan. 5, 1915 |
| 1,895,096 | Doloukhanoff | Jan. 24, 1933 |
| 2,445,434 | Hornbarger | July 20, 1948 |
| 2,552,028 | Blair | May 8, 1951 |

FOREIGN PATENTS

| Number | Country | Date |
|---|---|---|
| 573,170 | France | Mar. 6, 1924 |